United States Patent
Ito et al.

(10) Patent No.: US 12,459,856 B2
(45) Date of Patent: Nov. 4, 2025

(54) GLASS COMPOSITION FOR GLASS FIBER, GLASS FIBER, GLASS FIBER WOVEN FABRIC, AND GLASS FIBER REINFORCED RESIN COMPOSITION

(71) Applicant: NITTO BOSEKI CO., LTD., Fukushima (JP)

(72) Inventors: Jun Ito, Koriyama (JP); Tadashi Kurita, Koriyama (JP); Koichi Nakamura, Koriyama (JP); Takashi Nonaka, Koriyama (JP); Norio Hirayama, Narashino (JP); Hidero Unuma, Yonezawa (JP)

(73) Assignee: Nitto Boseki Co., Ltd., Fukushima (JP)

( * ) Notice: Subject to any disclaimer, the term of this patent is extended or adjusted under 35 U.S.C. 154(b) by 0 days.

(21) Appl. No.: 19/103,291

(22) PCT Filed: Jun. 5, 2024

(86) PCT No.: PCT/JP2024/020508
§ 371 (c)(1),
(2) Date: Feb. 12, 2025

(87) PCT Pub. No.: WO2025/047032
PCT Pub. Date: Mar. 6, 2025

(65) Prior Publication Data
US 2025/0263329 A1    Aug. 21, 2025

(30) Foreign Application Priority Data

Aug. 31, 2023  (JP) ................. 2023-141466

(51) Int. Cl.
| | |
|---|---|
| C03C 13/00 | (2006.01) |
| C03C 3/064 | (2006.01) |
| C03C 3/091 | (2006.01) |
| C08J 5/04 | (2006.01) |
| D03D 15/267 | (2021.01) |

(52) U.S. Cl.
CPC .............. *C03C 13/00* (2013.01); *C03C 3/064* (2013.01); *C03C 3/091* (2013.01); *C08J 5/043* (2013.01); *D03D 15/267* (2021.01)

(58) Field of Classification Search
CPC ................................ C03C 3/064; C03C 3/091
See application file for complete search history.

(56) References Cited

U.S. PATENT DOCUMENTS

| | | | |
|---|---|---|---|
| 2012/0095149 A1* | 4/2012 | Sawanoi ............... | H05K 1/0366 428/401 |
| 2019/0322568 A1* | 10/2019 | Saito ..................... | C03B 5/0332 |
| 2023/0312394 A1 | 10/2023 | Nonaka et al. | |

FOREIGN PATENT DOCUMENTS

| | | |
|---|---|---|
| JP | S56-005352 A | 1/1981 |
| JP | H01-093436 A | 4/1989 |
| JP | 2009-286686 A | 12/2009 |
| JP | 7107468 B1 | 7/2022 |
| WO | 2019/077883 A1 | 4/2019 |
| WO | 2022/138823 A1 | 6/2022 |

OTHER PUBLICATIONS

PCT/ISA/210 from International Application PCT/JP2024/020508—not yet published.
PCT/ISA/237 from International Application PCT/JP2024/020508—not yet published.

* cited by examiner

*Primary Examiner* — Jenna N Chandhok
(74) *Attorney, Agent, or Firm* — Carrier, Shende & Associates P.C.; Joseph P. Carrier; Jeffrey T. Gedeon

(57) ABSTRACT

To provide a glass composition for glass fiber that includes biosolubility, can achieve long fiber formation, and can provide a glass filament with sufficiently high strength even when exposed to water and a high temperature and high humidity environment. The glass composition for glass fiber of the present invention includes 35.00 to 50.00% by mass of $SiO_2$, 12.00 to 28.00% by mass of $Al_2O_3$, 10.00 to 25.00% by mass of $B_2O_3$, 2.00 to 18.00% by mass of MgO, and 5.00 to 25.00% by mass of CaO, with respect to the total amount, and the total content of MgO and CaO is 17.09 to 30.00% by mass and MgO/CaO is 0.29 to 1.92.

8 Claims, No Drawings

GLASS COMPOSITION FOR GLASS FIBER, GLASS FIBER, GLASS FIBER WOVEN FABRIC, AND GLASS FIBER REINFORCED RESIN COMPOSITION

TECHNICAL FIELD

The present invention relates to a glass composition for glass fiber, glass fiber, a glass fiber woven fabric, and a glass fiber-reinforced resin composition.

BACKGROUND ART

Reduction in the weight, thickness, length, and size in printed wiring boards including a glass fiber-reinforced resin composition, especially a glass fiber woven fabric has been under progress in recent years, and accordingly, extremely thin long glass fiber also has been demanded. For this reason, biosolubility will be considered to be an important property also for long glass fiber in the future.

Thus, the present inventors have already proposed a glass composition for glass fiber that comprises biosolubility and can achieve long fiber formation (see Patent Literature 1).

CITATION LIST

Patent Literature

Patent Literature 1: Japan Patent Publication No. 7107468

SUMMARY OF INVENTION

Technical Problem

The long glass fiber may be exposed to water during the step of applying a surface treatment agent to the glass fiber surface in its spinning process, or during the step of opening glass fiber woven fabric in the process of processing the glass fiber into the form of glass roving, glass yarn, glass fiber woven fabric, or the like. The long glass fiber may also be exposed to a high temperature and high humidity environment depending on weather conditions when it is stored for a long period of time in a warehouse with inadequate air conditioning control during the process of processing it into a final product such as glass fiber-reinforced resin composition, or when it is utilized as a final product.

However, since the long glass fiber comprising biosolubility is hydrophilic and thus has low water resistance, exposure to water or a high temperature and high humidity environment may cause disadvantages such as a decrease in the strength of the glass filament, which leads to advanced deterioration of the product, and cutting of the glass filament due to the tension applied when the glass fiber is transported, which leads to micro-fluff formation.

Thus, an object of the present invention is to provide a glass composition for glass fiber that comprises biosolubility, can achieve long fiber formation, and can provide a glass filament comprising sufficiently high strength even when exposed to water or a high temperature and high humidity environment by eliminating such disadvantages.

Solution to Problem

In order to achieve the object, the glass composition for glass fiber of the present invention includes $SiO_2$ in the range of 35.00 to 50.00% by mass; $Al_2O_3$ in the range of 12.00 to 28.00% by mass; $B_2O_3$ in the range of 10.00 to 25.00% by mass; MgO in the range of 2.00 to 18.00% by mass; and CaO in the range of 5.00 to 25.00% by mass, with respect to the total amount, and the total content of MgO and CaO is in the range of 17.09 to 30.00% by mass and the ratio of the content of MgO to the content of CaO (MgO/CaO) is in the range of 0.29 to 1.92.

Since the glass composition for glass fiber of the present invention comprises the above configuration, the composition comprises biosolubility, can achieve long fiber formation, and can provide a glass filament comprising sufficiently high strength even when exposed to water or a high temperature and high humidity environment.

Here, the term "comprises biosolubility" means that the biosolubility described below is 100 µg/h or more, the term "can achieve long fiber formation" means that the working temperature range, which is the difference between 1000 poise temperature and liquid phase temperature, is 0° C. or more, and the term "comprising sufficiently high strength even when exposed to water or a high temperature and high humidity environment" means that the strength at water absorption described below is 2.1 GPa or more (that is, having a strength at water absorption equivalent to or higher than that of a glass fiber made of E-glass composition).

In the glass composition for glass fiber of the present invention, the ratio of the content of MgO to the content of CaO (MgO/CaO) is preferably in the range of 0.49 to 1.68, and the composition comprises biosolubility, facilitates long fiber formation, and can provide a glass filament comprising excellent strength even when exposed to water or a high temperature and high humidity environment.

Here, the term "facilitates long fiber formation" means that the working temperature range, which is the difference between 1000 poise temperature and liquid phase temperature, is 100° C. or more, and the term "comprising excellent strength even when exposed to water or a high temperature and high humidity environment" means that the strength at water absorption described below is 2.3 GPa or more.

The glass fiber of the present invention includes a glass filament formed of the glass composition for glass fiber of the present invention. In the glass fiber of the present invention, the filament diameter of the glass filament is preferably less than 3.0 µm.

The glass fiber woven fabric and glass fiber-reinforced resin composition of the present invention include the glass fiber of the present invention.

DESCRIPTION OF EMBODIMENTS

Hereinafter, embodiments of the present invention will be described in detail.

The glass composition for glass fiber of the present embodiment includes $SiO_2$ in the range of 35.00 to 50.00% by mass; $Al_2O_3$ in the range of 12.00 to 28.00% by mass; $B_2O_3$ in the range of 10.00 to 25.00% by mass; MgO in the range of 2.00 to 18.00% by mass; and CaO in the range of 5.00 to 25.00% by mass, with respect to the total amount, and the total content of MgO and CaO is in the range of 17.09 to 30.00% by mass and the ratio of the content of MgO to the content of CaO (MgO/CaO) is in the range of 0.29 to 1.92.

In the glass composition for glass fiber of the present embodiment, when the content of $SiO_2$ is less than 35.00% by mass with respect to the total amount, the strength and elastic modulus of the long glass fiber decrease, and thus, when the composition is used in a composite material with a resin, the effect of reinforcing the resin becomes insufficient. In contrast, the content of $SiO_2$ exceeds 50.00% by mass with respect to the total amount, the biosolubility may be lowered.

In a glass composition for glass fiber of the present embodiment, the content of $SiO_2$ is preferably in the range of 35.50 to 49.40% by mass, more preferably in the range of 37.00 to 48.90% by mass, still more preferably in the range of 38.00 to 47.90% by mass, especially preferably in the range of 39.00 to 47.00% by mass, particularly preferably in the range of 40.00 to 46.00% by mass, markedly preferably in the range of 41.00 to 45.00% by mass, and most preferably in the range of 41.60 to 44.40% by mass, with respect to the total amount.

In the glass composition for glass fiber of the present embodiment, when the content of $Al_2O_3$ is less than 12.00% by mass with respect to the total amount, the strength and the elastic modulus of the long glass fiber decrease, and thus, when the composition is used in a composite material with a resin, the effect of reinforcing the resin becomes insufficient. In contrast, when the content of $Al_2O_3$ is more than 28.00% by mass with respect to the total amount, the devitrification temperature of the molten glass increases, and thus long fiber formation may become difficult.

In the glass composition for glass fiber of the present embodiment, the content of $Al_2O_3$ is preferably in the range of 15.10 to 27.00% by mass, more preferably in the range of 16.10 to 26.00% by mass, still more preferably in the range of 17.00 to 25.00% by mass, particularly preferably in the range of 18.00 to 24.00% by mass, markedly preferably in the range of 18.50 to 23.00% by mass, and most preferably in the range of 19.00 to 22.00% by mass, with respect to the total amount.

In the glass composition for glass fiber of the present embodiment, when the content of $B_2O_3$ is less than 10.00% by mass with respect to the total amount, the devitrification temperature of the molten glass increases, thus long fiber formation may become difficult, and the biosolubility may decrease. In contrast, when the content of $B_2O_3$ exceeds 25.00% by mass with respect to the total amount, phase separation occurs in the molten glass, and thus long fiber formation becomes difficult.

In the glass composition for glass fiber of the present embodiment, the content of $B_2O_3$ is preferably in the range of 11.10 to 24.00% by mass, more preferably in the range of 12.00 to 21.30% by mass, still more preferably in the range of 12.30 to 18.00% by mass, especially preferably in the range of 12.50 to 17.50% by mass, particularly preferably in the range of 12.70 to 17.00% by mass, markedly preferably in the range of 12.80 to 16.50% by mass, and most preferably in the range of 13.50 to 16.20% by mass, with respect to the total amount.

In the glass composition for glass fiber of the present embodiment, when the content of MgO is less than 2.00% by mass with respect to the total amount, the elastic modulus of the long glass fiber decreases, and thus, when the composition is used in a composite material with a resin, the effect of reinforcing the resin becomes insufficient. In contrast, when the content of MgO exceeds 18.00% by mass with respect to the total amount, the strength of the long glass fiber decreases, and thus, when the composition is used in a composite material with a resin, the effect of reinforcing the resin becomes insufficient.

In the glass composition for glass fiber of the present embodiment, the content of MgO is preferably in the range of 3.10 to 17.00% by mass, more preferably in the range of 5.10 to 16.00% by mass, still more preferably in the range of 6.10 to 15.40% by mass, especially preferably in the range of 8.10 to 15.00% by mass, particularly preferably in the range of 8.40 to 14.00% by mass, markedly preferably in the range of 8.60 to 13.00% by mass, remarkably preferably in the range of 8.70 to 12.00% by mass, and most preferably in the range of 9.10 to 11.95% by mass, with respect to the total amount.

In the glass composition for glass fiber of the present embodiment, when the content of CaO is less than 5.00% by mass with respect to the total amount, the elastic modulus of the long glass fiber decreases, and thus, when the composition is used in a composite material with a resin, the effect of reinforcing the resin becomes insufficient. In contrast, when the content of CaO exceeds 25.00% by mass with respect to the total amount, the strength of the long glass fiber decreases, and thus, when the composition is used in a composite material with a resin, the effect of reinforcing the resin becomes insufficient.

In the glass composition for glass fiber of the present embodiment, the content of CaO is preferably in the range of 5.60 to 24.00% by mass, more preferably in the range of 6.60 to 23.00% by mass, still more preferably in the range of 10.10 to 22.50% by mass, particularly preferably in the range of 13.40 to 22.00% by mass, markedly preferably in the range of 13.80 to 21.90% by mass, and most preferably in the range of 14.00 to 17.90% by mass, with respect to the total amount.

In the glass composition for glass fiber of the present embodiment, when the total content of MgO and CaO is less than 17.09% by mass with respect to the total amount, the strength of the glass filament decreases when the long glass fiber absorbs water. In contrast, when the total content of MgO and CaO exceeds 30.00% by mass with respect to the total amount, the strength of the long glass fiber decreases, and thus, when the composition is used in a composite material with a resin, the effect of reinforcing the resin becomes insufficient.

In the glass composition for glass fiber of the present embodiment, the total content of MgO and CaO is preferably in the range of 18.00 to 29.00% by mass, more preferably in the range of 19.00 to 28.00% by mass, still more preferably in the range of 20.00 to 27.00% by mass, particularly preferably in the range of 20.50 to 26.00% by mass, markedly preferably in the range of 21.00 to 25.00% by mass, and most preferably in the range of 22.00 to 24.50% by mass, with respect to the total amount.

In the glass composition for glass fiber of the present embodiment, when the ratio of the content of MgO to the content of CaO (MgO/CaO) is less than 0.29, the strength of the glass filament decreases when the long glass fiber absorbs water. In contrast, when the ratio of the content of MgO to the content of CaO (MgO/CaO) exceeds 1.92, the devitrification temperature of the molten glass increases, and thus long fiber formation becomes difficult.

In the glass composition for glass fiber of the present embodiment, the ratio of the content of MgO to the content of CaO (MgO/CaO) is preferably in the range of 0.34 to 1.75, more preferably in the range of 0.49 to 1.68, still more preferably in the range of 0.51 to 1.30, particularly preferably in the range of 0.52 to 0.99, and most preferably in the range of 0.61 to 0.92.

Further, in the glass composition for glass fiber of the present embodiment, the total content of $SiO_2$, $B_2O_3$, $Al_2O_3$, CaO, and MgO is, for example, 91.00% by mass or more, preferably 95.00% by mass or more, more preferably 98.00% by mass or more, still more preferably 99.00% by mass or more, especially preferably 99.30% by mass or more, particularly preferably 99.50% by mass or more, markedly preferably 99.70% by mass or more, and most preferably 99.90% by mass or more, with respect to the total amount.

The glass composition for glass fiber of the present embodiment may also include $Fe_2O_3$, from the viewpoint of improving the deaeration ability of the molten glass and improving stability of long fiber formation. The content of $Fe_2O_3$ is, for example, in the range of 0 to 0.40% by mass, preferably in the range of 0 to 0.30% by mass, more preferably in the range of 0 to 0.20% by mass, still more preferably in the range of 0 to 0.10% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $ZrO_2$, from the viewpoint of lowering the melt viscosity of the molten glass and facilitating long fiber formation. The content of $ZrO_2$ is, for example, in the range of 0 to 0.60% by mass, preferably in the range of 0 to 0.30% by mass, more preferably in the range of 0 to 0.20% by mass, still more preferably in the range of 0 to 0.10% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $F_2$ and $Cl_2$, from the viewpoint of improving the deaeration ability of the molten glass and improving stability of long fiber formation. The total content of $F_2$ and $Cl_2$ is, for example, in the range of 0 to 0.40% by mass, preferably in the range of 0 to 0.30% by mass, more preferably in the range of 0 to 0.20% by mass, still more preferably in the range of 0 to 0.10% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include SrO, from the viewpoint of lowering the melt viscosity of the molten glass and facilitating long fiber formation. The content of SrO is, for example, in the range of 0 to 0.40% by mass, preferably in the range of 0 to 0.30% by mass, more preferably in the range of 0 to 0.20% by mass, still more preferably in the range of 0 to 0.10% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include ZnO, from the viewpoint of suppressing increase in the devitrification temperature of the molten glass and facilitating long fiber formation. The content of ZnO is, for example, in the range of 0 to 0.40% by mass, preferably in the range of 0 to 0.30% by mass, more preferably in the range of 0 to 0.20% by mass, still more preferably in the range of 0 to 0.10% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may also include $SnO_2$, from the viewpoint of suppressing increase in the devitrification temperature of the molten glass and facilitating long fiber formation. The content of $SnO_2$ is, for example, in the range of 0 to 0.40% by mass, preferably in the range of 0 to 0.30% by mass, more preferably in the range of 0 to 0.20% by mass, still more preferably in the range of 0 to 0.10% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may include $P_2O_5$, from the viewpoint of suppressing increase in the devitrification temperature of the molten glass and facilitating long fiber formation. From the viewpoint of suppressing generation of bubbles in the molten glass, the content of $P_2O_5$ is, for example, in the range of less than 2.50% by mass, preferably in the range of less than 1.50% by mass, more preferably in the range of less than 1.00% by mass, still more preferably in the range of less than 0.80% by mass, markedly particularly preferably in the range of less than 0.60% by mass, and most preferably in the range of less than 0.50% by mass, with respect to the total amount of the glass composition for glass fiber of the present embodiment.

When the glass composition for glass fiber of the present embodiment includes $TiO_2$, the content of $TiO_2$ is, for example, in the range of 1.90% by mass or less, preferably in the range of 0 to 0.40% by mass, more preferably in the range of 0 to 0.20% by mass, still more preferably in the range of 0 to less than 0.10% by mass, particularly preferably in the range of 0 to 0.05% by mass, and most preferably in the range of 0 to 0.01% by mass, with respect to the total amount of the glass composition for glass fiber of the present embodiment. When the content of $TiO_2$ exceeds 1.90% by mass, the biosolubility may decrease on formation of glass fiber.

The glass composition for glass fiber of the present embodiment may include $Li_2O$, $K_2O$, and $Na_2O$, from the viewpoint of lowering the melt viscosity of the molten glass and facilitating long fiber formation. The total content of $Li_2O$, $K_2O$, and $Na_2O$ is, for example, in the range of 0 to 0.90% by mass, preferably in the range of 0 to 0.40% by mass, more preferably in the range of 0 to 0.20% by mass, still more preferably in the range of 0 to 0.10% by mass, particularly preferably in the range of 0 to 0.05% by mass, and most preferably in the range of 0 to 0.01% by mass, with respect to the total amount of the glass composition for glass fiber of the present embodiment.

The glass composition for glass fiber of the present embodiment may include, as impurities attributable to raw materials, oxides of Ba, Mn, Co, Ni, Cu, Mo, W, Ce, Y, La, Bi, Gd, Pr, Sc, or Yb in total in the range of less than 1.00% by mass with respect to the total amount of the glass composition for glass fiber. Particularly when the glass composition for glass fiber of the present embodiment includes BaO, $CeO_2$, $Y_2O_3$, $La_2O_3$, $Bi_2O_3$, $Gd_2O_3$, $Pr_2O_3$, $Sc_2O_3$, or $Yb_2O_3$ as impurities, the content of each of the impurities is independently preferably in the range of less than 0.40% by mass, more preferably in the range of less than 0.20% by mass, still more preferably in the range of less than 0.10% by mass, particularly preferably in the range of less than 0.05% by mass, markedly preferably in the range of less than 0.01% by mass, and most preferably in the range of less than 0.004% by mass.

In the glass composition for glass fiber of the present embodiment, the ratio of the content of MgO to the content of $Al_2O_3$ ($MgO/Al_2O_3$) is preferably 0.28 or more from the viewpoint of comprising a more excellent elastic modulus on formation of glass fiber, and is preferably 0.63 or less from the viewpoint of being excellent in water resistance on formation of glass fiber. The ratio of the content of MgO to the content of $Al_2O_3$ ($MgO/Al_2O_3$) is preferably in the range of 0.28 to 0.77, and more preferably in the range of 0.41 to 0.63.

Further, in the glass composition for glass fiber of the present embodiment, from the viewpoint of comprising more excellent biosolubility and facilitating long fiber formation on formation of glass fiber, the content S of $SiO_2$, the content A of $Al_2O_3$, the content B of $B_2O_3$, the content M of MgO, and the content C of CaO, preferably satisfy the following formula (1), and more preferably satisfy the following formula (2):

$$20.8 \leq S \times (C + M)/(A + B) \leq 34.0 \quad (1)$$

$$27.0 \leq S \times (C + M)/(A + B) \leq 33.0. \quad (2)$$

In the above formula (1) or the above formula (2), as described above, when C+M is too small, the glass filament strength tends to decrease when the long glass fiber absorbs water, while when it is too large, the viscosity of the glass tends to decrease and the working temperature range tends to become narrower, thereby making it more difficult to achieve long fiber formation. Also, among the components that form the glass framework, S/(A+B) represents the content of $SiO_2$ with respect to the total content of $Al_2O_3$ and $B_2O_3$, and when it is too small, the mechanical properties of the glass fiber tend to worsen, while when it is too large, the meltability tends to worsen and the biosolubility tends to decrease.

When the lower limit of the above formula (1) or the above formula (2) is 20.8 or more, preferably 27.0 or more, there is a tendency that the glass filament is less likely to deteriorate at water absorption while maintaining the biosolubility of the long glass fiber. When the upper limit of the above formula (1) or the above formula (2) is 34.0 or less, preferably 33.0 or less, biosolubility is improved, and the stability of long fiber formation is improved by widening the working temperature range.

Regarding measurement of the content of each component described above in the glass composition for glass fiber of the present embodiment, the content of Li as the light element can be measured with an ICP emission spectroscopic analyzer, and the contents of the other elements can be measured with a wavelength dispersive X-ray fluorescence analyzer. The content of each component described above can be specifically measured as follows.

First, a glass batch prepared by mixing a glass raw material, or glass fiber is placed in a platinum crucible, and melted with stirring while being held at a temperature of 1350 to 1550° C. for the glass batch and at a temperature of 1300 to 1450° C. for the glass fiber for 6 hours in an electric furnace to obtain a homogeneous molten glass. When organic matter adheres to the surface of the glass fiber, or when glass fiber is mainly included as a reinforcing material in organic matter such as resin, the glass fiber is used after the organic matter is removed by, for example, heating for about 0.5 to 24 hours in a muffle furnace at 300 to 650° C.

Next, the obtained molten glass is poured onto a carbon plate to produce a glass cullet, and then pulverized and powdered into glass powder. Regarding Li as a light element, the glass powder is thermally decomposed with an acid and then quantitatively analyzed using an ICP emission spectroscopic analyzer. Regarding other elements, the glass powder is molded into a disc shape by a pressing machine and then quantitatively analyzed using a wavelength dispersive X-ray fluorescence analyzer. For the quantitative analysis using a wavelength dispersive X-ray fluorescence analyzer, specifically, a sample for calibration curve can be prepared based on the results measured by the fundamental parameter method, and then analyzed by the calibration curve method. The content of each component in the sample for calibration curve can be quantitatively analyzed by an ICP emission spectroscopic analyzer.

These quantitative analysis results are converted in terms of oxides to calculate the content of each component and the total amount, and the above content of each component can be determined from these numerical values (% by mass).

Then, the glass fiber of the present embodiment includes a glass filament formed of the above glass composition for glass fiber of the present embodiment. The glass fiber of the present embodiment can be manufactured as follows.

First, a glass raw material (glass batch) prepared to have the composition of the glass composition for glass fiber of the present embodiment, based on the content of components included in ores to be the glass raw material and each component and the amount of each component volatilized in the melting process, is supplied to a melting furnace and melted at a temperature in the range of 1350 to 1550° C., for example. Then, the molten glass batch (molten glass) is drawn from 1 to 20000 nozzle tips of a bushing controlled at a predetermined temperature and rapidly cooled to form glass filaments.

Subsequently, the glass filaments formed are applied with a sizing agent or binder using an applicator as an application apparatus. While 1 to 20000 of the glass filaments are bundled using a bundling shoe, the glass filaments are wound on a tube at a high speed using a winding apparatus to obtain glass fiber.

When the glass composition for glass fiber of the present embodiment is melted at a temperature within the above range for manufacturing the above glass fiber, 1000 poise temperature and liquid phase temperature are used to calculate the working temperature range ΔT (working temperature range ΔT=1000 poise temperature-liquid phase temperature). When ΔT is 0° C. or more, long fiber formation can be achieved, and when ΔT is 100° C. or more, long fiber formation is facilitated.

Glass single fiber (glass filament) discharged from one nozzle tip or hole, cooled and solidified typically has a perfect circle cross-sectional shape and preferably has a diameter (filament diameter) of less than 3.0 µm. On the other hand, when the above nozzle tip has a non-circular shape and has a protrusion or a notch for rapidly cooling the molten glass, controlling the temperature condition can provide a glass filament having a non-circular, such as elliptical or long-oval, cross-sectional shape. When the glass filament has an elliptical or long-oval cross-sectional shape, the converted fiber diameter, which is a fiber diameter when the cross-sectional area is converted to a perfect circle, is preferably less than 3.0 µm. The lower limit value of the above filament diameter is, for example, 0.5 µm, preferably 1.0 µm, and more preferably 2.0 µm.

The filament diameter of the above glass filament can be calculated as follows, for example. First, the glass fiber is embedded in a resin such as an epoxy resin, and the resin is cured. The cured resin is cut, and the cross section is polished. Then, the cross section of the cured resin is observed using an electron microscope, and the diameter of 50 or more glass filaments exposed at the above cross section is measured in the case of the glass filaments each having a perfect-circular or substantially perfect-circular cross-sectional shape. In the case of the cross-sectional shape of the glass filaments being other than perfect-circular or substantially perfect-circular, the cross-sectional area is calculated, and the converted fiber diameter is calculated based on the cross-sectional area. Then, the filament diameter of the glass filaments is calculated by determining the average value of the measured or calculated diameters or converted fiber diameters. The filament diameter of the above glass filament also can be measured by image-processing images obtained with an electron microscope by an automatic analyzer.

Meanwhile, when the glass fiber of the present embodiment is included in a glass fiber-reinforced resin molded article, the filament diameter of the above glass filaments can be measured as follows, for example. First, the glass fiber-reinforced resin molded article is heated at 625° C. for 30 minutes to burn the thermoplastic resin off, and the glass fiber is taken out. Then, the filament diameter of the above glass filaments is measured in the same manner as in the method for measuring the filament diameter of the above glass filaments in the glass fiber described above.

The glass fiber of the present embodiment may be coated with an organic matter on the surface thereof for the purposes such as improvement of glass filament convergence, improvement of adhesiveness between glass fiber and a resin, and improvement of uniform dispersibility of glass fiber in a mixture of glass fiber and resin or inorganic material. Examples of such an organic matter can include starch, urethane resins, epoxy resins, vinyl acetate resins, acrylic resins, modified polypropylene, particularly carboxylic acid-modified polypropylene, and a copolymer of (poly)carboxylic acid, particularly maleic acid, and an unsaturated monomer.

The glass fiber of the present embodiment may be coated with the resin composition including a silane coupling agent, a lubricant, surfactant, and the like in addition to these resins. The glass fiber of the present embodiment may be coated with the treating agent composition not including the above resins and including a silane coupling agent, surfactant, and the like. Such a resin composition or treating agent composition covers the glass fiber at a rate of 0.03 to 2.0% by mass based on the mass of the glass fiber of the present embodiment in a state where it is not coated with the resin composition or the treating agent composition.

The glass fiber can be coated with the organic matter by applying a resin solution or a resin composition solution to the glass fiber using a known method such as a roller applicator, for example, in the manufacturing process of the glass fiber and then drying the glass fiber to which the resin solution or the resin composition solution is applied. The coating of the glass fiber with an organic matter can be performed by immersing the glass fiber of the present embodiment in the form of a woven fabric in the treating agent composition solution and then drying the glass fiber to which the treating agent composition is applied.

Here, examples of the silane coupling agent include aminosilanes, ureidosilanes, chlorosilanes, epoxysilanes, mercaptosilanes, vinylsilanes, (meth)acrylsilanes, phenylsilanes, styrylsilanes, and isocyanate silanes. In the present embodiment, the silane coupling agents may be used singly or in combination of two or more.

Examples of the aminosilane include γ-aminopropyltriethoxysilane, N-β-(aminoethyl)-γ-aminopropyltrimethoxysilane, N-β-(aminoethyl)-N'-β-(aminoethyl)-γ-aminopropyltrimethoxysilane, and γ-anilinopropyltrimethoxysilane.

Examples of the ureidosilane include γ-ureidopropyltriethoxysilane.

Examples of the chlorosilane include γ-chloropropyltrimethoxysilane.

Examples of the epoxysilane include β-(3,4-epoxycyclohexyl)ethyltrimethoxysilane and γ-glycidoxypropyltrimethoxysilane.

Examples of the mercaptosilane include γ-mercaptotrimethoxysilane and γ-mercaptopropyltrimethoxysilane.

Examples of the vinylsilane include vinyltrimethoxysilane, N-β-(N-vinylbenzylaminoethyl)-γ-aminopropyltrimethoxysilane, and N-benzyl-β-aminoethyl-γ-aminopropyltrimethoxysilane.

Examples of the (meth)acrylsilane include γ-acryloxypropyltrimethoxysilane and γ-methacryloxypropyltrimethoxysilane.

Examples of the phenylsilane include phenyltrimethoxysilane.

Examples of the styrylsilane include p-styryltrimethoxysilane.

Examples of the isocyanate silane include γ-isocyanate propyltriethoxysilane.

Examples of the lubricant include modified silicone oils, animal oils and hydrogenated products thereof, vegetable oils and hydrogenated products thereof, animal waxes, vegetable waxes, mineral waxes, condensates of a higher saturated fatty acid and a higher saturated alcohol, polyethyleneimine, polyalkylpolyamine alkylamide derivatives, fatty acid amides, and quaternary ammonium salts. In the present embodiment, the lubricants may be used singly or in combination of two or more.

Examples of the animal oil include beef tallow.

Examples of the vegetable oil include soybean oil, coconut oil, rapeseed oil, palm oil, and castor oil.

Examples of the animal wax include beeswax and lanolin.

Examples of the vegetable wax include candelilla wax and carnauba wax.

Examples of the mineral wax include paraffin wax and montan wax.

Examples of the condensate of a higher saturated fatty acid and a higher saturated alcohol include stearates such as lauryl stearate.

Examples of the fatty acid amide include dehydrated condensates of polyethylenepolyamines such as diethylenetriamine, triethylenetetramine, and tetraethylenepentamine and fatty acids such as lauric acid, myristic acid, palmitic acid, and stearic acid.

Examples of the quaternary ammonium salt include alkyltrimethylammonium salts such as lauryltrimethylammonium chloride.

Examples of the surfactant include nonionic surfactants, cationic surfactants, anionic surfactants, and amphoteric surfactants. In the present embodiment, the surfactants may be used singly or in combination of two or more.

Examples of the nonionic surfactant include ethylene oxide propylene oxide alkyl ether, polyoxyethylene alkyl ether, polyoxyethylene-polyoxypropylene-block copolymer, alkyl polyoxyethylene-polyoxypropylene block copolymer ether, polyoxyethylene fatty acid ester, polyoxyethylene fatty acid monoester, polyoxyethylene fatty acid diester, polyoxyethylene sorbitan fatty acid ester, glycerol fatty acid ester ethylene oxide adduct, polyoxyethylene castor oil ether, hydrogenated castor oil ethylene oxide adduct, alkylamine ethylene oxide adduct, fatty acid amide ethylene oxide adduct, glycerol fatty acid ester, polyglycerol fatty acid ester, pentaerythritol fatty acid ester, sorbitol fatty acid ester, sorbitan fatty acid ester, sucrose fatty acid ester, polyhydric alcohol alkyl ether, fatty acid alkanolamide, acetylene glycol, acetylene alcohol, ethylene oxide adduct of acetylene glycol, and ethylene oxide adduct of acetylene alcohol.

Examples of the cationic surfactant include alkyldimethylbenzylammonium chloride, alkyltrimethylammonium chloride, alkyl dimethyl ethyl ammonium ethyl sulfate, higher alkylamine salts (such as acetate and hydrochloride), adduct of ethylene oxide to a higher alkylamine, condensate of a higher fatty acid and polyalkylene polyamine, a salt of an ester of a higher fatty acid and alkanolamine, a salt of higher fatty acid amide, imidazoline cationic surfactant, and alkyl pyridinium salt.

Examples of the anionic surfactant include higher alcohol sulfate salts, higher alkyl ether sulfate salts, α-olefin sulfate salts, alkylbenzene sulfonate salts, α-olefin sulfonate salts, reaction products of fatty acid halide and N-methyl taurine, dialkyl sulfosuccinate salts, higher alcohol phosphate ester salts, and phosphate ester salts of higher alcohol ethylene oxide adduct.

Examples of the amphoterie surfactant include amino acid amphoterie surfactants such as alkali metal salts of alkylaminopropionic acid, betaine amphoteric surfactants such as alkyldimethylbetaine, and imidazoline amphoteric surfactants.

Examples of the form of the glass fiber include woven fabrics (glass cloths), knitted fabrics, yarns, chopped strands, rovings, chopped strand mats, paper, mesh, braided fabrics, and milled fiber. Chopped strands, rovings, and woven fabrics (glass cloths) are preferred, and woven fabrics (glass cloths) are still more preferred.

For example, when the glass fiber of the present embodiment is a chopped strand, the number of glass filaments constituting the glass fiber of the present embodiment is, for example, 10 to 20000, preferably 50 to 10000, and more preferably 1000 to 8000. The length of the chopped strand, which is the glass fiber of the present embodiment, is, for example, 1.0 to 100.0 mm, preferably 1.2 to 51.0 mm, more preferably 1.5 to 30.0 mm, still more preferably 2.0 to 15.0 mm, and particularly preferably 2.3 to 7.8 mm. Here, the chopped strand can be obtained by cutting the glass fiber produced by the method described above to the predetermined length with a known apparatus, such as a long fiber cutting apparatus, in which the glass strand is fed between a cutter roller with cutters (cutting blades) attached radially at equal intervals and a rubber roller rotating in contact with it and equipped with rubber on its outer circumferential surface, to cut the glass strand. When the glass fiber of the present embodiment is a roving, the number of glass filaments constituting the glass fiber of the present embodiment is, for example, 200 to 30000. The roving, which is the glass fiber of the present embodiment, comprises a mass per unit length of 0.5 to 10000 tex (g/1000 m).

The glass fiber woven fabric of the present embodiment is formed of the above glass fiber of the present embodiment. The glass fiber woven fabric of the present embodiment can be obtained by weaving the above glass fiber as warp yarns and weft yarns using a loom known per se. Examples of the loom may include jet looms such as air jet or water jet looms, shuttle looms, and rapier looms. Examples of weaving with the loom may include plain weaving, satin weaving, mat weaving, and twill weaving. From the viewpoint of production efficiency, plain weaving is preferred.

The above glass fiber of the present embodiment included in the glass fiber woven fabric of the present embodiment preferably is formed of glass filaments comprising a filament diameter of 2.0 μm or more and 9.0 μm or less and comprises a mass of 0.35 to 70.0 tex (g/1000 m), more preferably comprises a mass of 0.5 to 70.0 tex (g/1000 m), still more preferably is formed of glass filaments comprising a filament diameter of 2.0 μm or more and less than 3.0 μm and comprises a mass of 0.35 to 1.5 tex, and particularly preferably comprises a mass of 0.5 to 1.5 tex.

Here, the filament diameter of the above glass fiber of the present embodiment included in the glass fiber woven fabric of the present embodiment is the average value of measurements when the diameter of the glass filaments constituting the above glass fiber is measured on at least 50 cross sections of the above glass fiber with a scanning electron microscope (manufactured by JEOL Ltd., trade name: JSM-IT800, magnification: 3000 times).

The glass fiber woven fabric of the present embodiment is preferably constituted by warp yarns comprising a weaving density of 40 to 150 yarns/25 mm and weft yarns comprising a weaving density of 40 to 150 yarns/25 mm.

The weaving density of the above warp yarns can be determined by counting the number of the warp yarns within a 25-mm range in the warp direction in accordance with JIS R3420 using a textile magnification glass. The weaving density of the above weft yarns can be determined by counting the number of the weft yarns within a 25-mm range in the weft direction in accordance with JIS R3420 using a textile magnification glass.

The glass fiber woven fabric of the present embodiment, after woven, may be subjected to desizing treatment, surface treatment, and opening treatment.

An example of the desizing treatment is a treatment including placing the glass fiber woven fabric in a heating oven having an atmosphere temperature of 350° C. to 400° C. for 40 to 80 hours to thereby pyrolytically decompose organic matter adhering to the glass fiber.

An example of the surface treatment is a treatment including immersing the glass fiber woven fabric in a solution including the silane coupling agent or including the silane coupling agent and the surfactant, squeezing extra water therefrom, and heat-drying the woven fabric in a temperature range of 80 to 180° C. for 1 to 30 minutes.

An example of the opening treatment is a treatment in which the warp yarns of the glass fiber woven fabric are subjected to opening by means of water flow pressure, opening by means of high-frequency vibration using a liquid as a medium, opening by means of the pressure of a fluid having a surface pressure, opening by means of pressing with a roll, or the like under a tension of 20 to 200 N to thereby widen the width of the warp yarns and weft yarns.

The glass fiber woven fabric of the present embodiment preferably comprises a mass in the range of 2.5 to 220 g/m², and more preferably comprises a mass in the range of 5.0 to 220 g/m². The glass fiber woven fabric of the present embodiment preferably comprises a thickness in the range of 4.0 to 200.0 μm.

The glass fiber woven fabric of the present embodiment may comprise a surface treatment layer including the silane coupling agent or the silane coupling agent and the surfactant. When the glass fiber woven fabric of the present embodiment includes the surface treatment layer, the surface treatment layer can have a mass in the range of 0.03 to 1.50% by mass, for example, with respect to the total amount of the glass fiber woven fabric including the surface treatment layer.

The glass fiber-reinforced resin composition of the present embodiment includes the above glass fiber of the present embodiment. Specifically, the glass fiber-reinforced resin composition of the present embodiment includes 10 to 90% by mass of glass fiber with respect to the total amount of the glass fiber-reinforced resin composition, as the glass fiber-reinforced resin composition including resin (thermoplastic resin or thermosetting resin), glass fiber, and other additives. The glass fiber-reinforced resin composition of the present embodiment includes 90 to 10% by mass of a resin and includes other additives in the range of 0 to 40% by mass with respect to the total amount of the glass fiber-reinforced resin composition.

Examples of the above thermoplastic resin can include polyethylene, polypropylene, polystyrene, styrene/maleic anhydride resins, styrene/maleimide resins, polyacrylonitrile, acrylonitrile/styrene (AS) resins, acrylonitrile/butadiene/styrene (ABS) resins, chlorinated polyethylene/acrylonitrile/styrene (ACS) resins, acrylonitrile/ethylene/styrene (AES) resins, acrylonitrile/styrene/methyl acrylate (ASA) resins, styrene/acrylonitrile (SAN) resins, methacrylic resins, polyvinyl chloride (PVC), polyvinylidene chloride (PVDC), polyamide, polyacetal, polyethylene terephthalate (PET), polybutylene terephthalate (PBT), polytrimethylene terephthalate (PTT), polycarbonate, polyarylene sulfide, polyethersulfone (PES), polyphenylsulfone (PPSU), polyphenylene ether (PPE), modified polyphenylene ether (m-PPE), polyaryl etherketone, liquid crystal polymer (LCP), fluororesins, polyetherimide (PEI), polyarylate (PAR), polysulfone (PSF), polyamideimide (PAI), polyaminobismaleimide (PABM), thermoplastic polyimide (TPI), polyethylene naphthalate (PEN), ethylene/vinyl acetate (EVA) resins, ionomer (IO) resins, polybutadiene, styrene/butadiene resins, polybutylene, polymethylpentene, olefin/vinyl alcohol resins, cyclic olefin resins, cellulose resins, polylactic acid, polyvinyl alcohol (PVA), polyglycolic acid (PGA), polybutylene succinate (PBS), polybutylene succinate adipate (PBSA), and polybutylene adipate terephthalate (PBAT).

Specific examples of the polyethylene include high density polyethylene (HDPE), medium density polyethylene, low density polyethylene (LDPE), linear low density polyethylene (LLDPE), and ultra high molecular weight polyethylene.

Examples of the polypropylene include isotactic polypropylene, atactic polypropylene, syndiotactic polypropylene, and mixtures thereof.

Examples of the polystyrene include general-purpose polystyrene (GPPS), which is an atactic polystyrene having an atactic structure, high impact polystyrene (HIPS) with a rubber component added to GPPS, and syndiotactic polystyrene with syndiotactic structure.

Examples of the methacrylic resin include polymers obtained by homopolymerizing one of acrylic acid, methacrylic acid, styrene, methyl acrylate, ethyl acrylate, ethyl methacrylate, butyl acrylate, butyl methacrylate, and fatty acid vinyl ester, or polymers obtained by copolymerizing two or more of these.

Examples of the polyvinyl chloride include a vinyl chloride homopolymer, a copolymer of a vinyl chloride monomer and a copolymerizable monomer, or a graft copolymer obtained by graft polymerization of a vinyl chloride monomer to polymer polymerized by a conventionally known method such as emulsion polymerization method, suspension polymerization method, micro suspension polymerization method, or bulk polymerization method.

Examples of the polyamide can include one of components such as polycaproamide (nylon 6), polyhexamethylene adipamide (nylon 66), polytetramethylene adipamide (nylon 46), polytetramethylene sebacamide (nylon 410), polypentamethylene adipamide (nylon 56), polypentamethylene sebacamide (nylon 510), polyhexamethylene sebacamide (nylon 610), polyhexamethylene dodecamide (nylon 612), polydecamethylene adipamide (nylon 106), polydecamethylene sebacamide (nylon 1010), polydecamethylene dodecamide (Nylon 1012), polyundecanamide (Nylon 11), polyundecamethylene adipamide (Nylon 116), polydodecanamide (Nylon 12), polyxylene adipamide (nylon XD6), polyxylene sebacamide (nylon XD10), polymetaxylylene adipamide (nylon MXD6), polyparaxylylene adipamide (nylon PXD6), polytetramethylene terephthalamide (nylon 4T), polypentamethylene terephthalamide (nylon 5T), polyhexamethylene terephthalamide (nylon 6T), polyhexamethylene isophthalamide (nylon 6I), polynonamethylene terephthalamide (nylon 9T), polydecamethylene terephthalamide (nylon 10T), polyundecamethylene terephthalamide (nylon 11T), polydodecamethylene terephthalamide (nylon 12T), polytetramethylene isophthalamide (nylon 4I), polybis(3-methyl-4-aminohexyl) methane terephthalamide (nylon PACMT), polybis(3-methyl-4-aminohexyl) methane isophthalamide (nylon PACMI), polybis(3-methyl-4-aminohexyl) methane dodecamide (nylon PACM12), and polybis(3-methyl-4-aminohexyl) methane tetradecamide (nylon PACM14) or copolymers or mixtures of two or more of the components.

Examples of the polyacetal include a homopolymer with oxymethylene units as the main repeating unit, and a copolymer mainly consisting of oxymethylene units and containing oxyalkylene units having 2 to 8 adjacent carbon atoms in the main chain.

Examples of the polyethylene terephthalate include a polymer obtained by polycondensation of terephthalic acid or a derivative thereof with ethylene glycol.

Examples of the polybutylene terephthalate include a polymer obtained by polycondensation of terephthalic acid or a derivative thereof with 1,4-butanediol.

Examples of the polytrimethylene terephthalate include polymers obtained by polycondensation of terephthalic acid or a derivative thereof with 1,3-propanediol.

Examples of the polycarbonate include polymers obtained by a transesterification method in which a dihydroxydiaryl compound is reacted with a carbonate such as diphenyl carbonate in a molten state; or polymers obtained by phosgene method in which a dihydroxyaryl compound is reacted with phosgene.

Examples of the polyarylene sulfide include linear polyphenylene sulfide, cross linked polyphenylene sulfide having a high molecular weight obtained by performing a curing reaction after polymerization, polyphenylene sulfide sulfone, polyphenylene sulfide ether, and polyphenylene sulfide ketone.

Examples of the polyphenylene ether include poly(2,3-dimethyl-6-ethyl-1,4-phenylene ether), poly(2-methyl-6-chloromethyl-1,4-phenylene ether), poly(2-methyl-6-hydroxyethyl-1,4-phenylene ether), poly(2-methyl-6-n-butyl-1,4-phenylene ether), poly(2-ethyl-6-isopropyl-1,4-phenylene ether), poly(2-ethyl-6-n-propyl-1,4-phenylene ether), poly(2,3,6-trimethyl-1,4-phenylene ether), poly [2-(4'-methylphenyl)-1,4-phenylene ether], poly(2-bromo-6-phenyl-1,4-phenylene ether), poly(2-methyl-6-phenyl-1,4-phenylene ether), poly(2-phenyl-1,4-phenylene ether), poly(2-chloro-1,4-phenylene ether), poly(2-methyl-1,4-phenylene ether), poly(2-chloro-6-ethyl-1,4-phenylene ether), poly(2-chloro-6-bromo-1,4-phenylene ether), poly(2,6-di-n-propyl-1,4-phenylene ether), poly(2-methyl-6-isopropyl-1,4-phenylene ether), poly(2-chloro-6-methyl-1,4-phenylene ether), poly(2-methyl-6-ethyl-1,4-phenylene ether), poly(2,6-dibromo-1,4-phenylene ether), poly(2,6-dichloro-1,4-phenylene ether), poly(2,6-diethyl-1,4-phenylene ether), and poly(2,6-dimethyl-1,4-phenylene ether).

Examples of the modified polyphenylene ether include: a polymer alloy of poly(2,6-dimethyl-1,4-phenylene) ether and polystyrene; a polymer alloy of poly(2,6-dimethyl-1,4-phenylene) ether and a styrene/butadiene copolymer; a polymer alloy of poly(2,6-dimethyl-1,4-phenylene) ether and a styrene/maleic anhydride copolymer; a polymer alloy of poly(2,6-dimethyl-1,4-phenylene)ether and polyamide; a polymer alloy of poly(2,6-dimethyl-1,4-phenylene) ether and styrene/butadiene/acrylonitrile copolymer; one obtained by introducing a functional group such as an amino group, an epoxy group, a carboxy group, a styryl group, or the like at the polymer chain end of the polyphenylene ether; and one obtained by introducing a functional group such as an amino group, an epoxy group, a carboxy group, a styryl group, a methacryl group, or the like at the polymer chain side chain of the polyphenylene ether.

Examples of the polyaryl etherketone include polyetherketone (PEK), polyetheretherketone (PEEK), polyetherketoneketone (PEKK), and polyetheretherketoneketone (PEEKK).

Examples of the liquid crystal polymer (LCP) include a polymer (copolymer) consisting of one or more structural units selected from aromatic hydroxycarbonyl units which are thermotropic liquid crystal polyesters, aromatic dihydroxy units, aromatic dicarbonyl units, aliphatic dihydroxy units, aliphatic dicarbonyl units, and the like.

Examples of the fluororesin include polytetrafluoroethylene (PTFE), perfluoroalkoxy resins (PFA), fluorinated ethylene propylene resins (FEP), fluorinated ethylene tetrafluoroethylene resins (ETFE), polyvinyl fluoride (PVF), polyvinylidene fluoride (PVDF), polychlorotrifluoroethylene (PCTFE), and ethylene/chlorotrifluoroethylene resin (ECTFE).

Examples of the ionomer (IO) resin include copolymers of an olefin or a styrene and an unsaturated carboxylic acid, wherein a part of carboxyl groups is neutralized with a metal ion.

Examples of the olefin/vinyl alcohol resin include ethylene/vinyl alcohol copolymers, propylene/vinyl alcohol copolymers, saponified products of ethylene/vinyl acetate copolymers, and saponified products of propylene/vinyl acetate copolymers.

Examples of the cyclic olefin resin include monocyclic compounds such as cyclohexene, polycyclic compounds such as tetracyclopentadiene, and polymers of cyclic olefin monomers.

Examples of the polylactic acid include poly-L-lactic acid which is a homopolymer of L-form, poly-D-lactic acid which is a homopolymer of D-form, or a stereocomplex polylactic acid which is a mixture thereof.

Examples of the cellulose resin can include methylcellulose, ethyl cellulose, hydroxycellulose, hydroxymethylcellulose, hydroxyethyl cellulose, hydroxyethyl methylcellulose, hydroxypropylmethylcellulose, cellulose acetate, cellulose propionate, and cellulose butyrate.

Examples of the above thermosetting resin can include unsaturated polyester resins, vinyl ester resins, epoxy (EP) resins, melamine (MF) resins, phenol resins (PF), urethane resins (PU), polyisocyanate, polyisocyanurate, modified polyimide (PI) resin, urea (UF) resins, silicone (SI) resins, furan (FR) resins, benzoguanamine (BR) resins, alkyd resins, xylene resins, bismaleimide triazine (BT) resins, and diallyl phthalate resin (PDAP).

Specific examples of the unsaturated polyester resin include resin obtained by esterification reaction of aliphatic unsaturated dicarboxylic acid and aliphatic diol, Examples of the vinyl ester resin include bis vinyl ester resins and novolac vinyl ester resins.

Examples of the epoxy resin include bisphenol A epoxy resins, bisphenol F epoxy resins, bisphenol E epoxy resins, bisphenol S epoxy resins, bisphenol M epoxy resins (4,4'-(1,3-phenylenediisopropylidene)bisphenol epoxy resins), bisphenol P epoxy resins (4,4'-(1,4-phenylenediisopropylidene)bisphenol epoxy resins), bisphenol Z epoxy resins (4,4'-cyclohexylidne bisphenol epoxy resins), phenol novolac epoxy resins, cresol novolac epoxy resins, tetraphenol group ethane novolac type epoxy resins, novolac epoxy resins having a condensed ring aromatic hydrocarbon structure, biphenyl epoxy resins, aralkyl epoxy resins such as xylylene epoxy resins and phenyl aralkyl epoxy resins, naphthylene ether epoxy resins, naphthol epoxy resins, naphthalene diol epoxy resins, bifunctional or tetrafunctional epoxy naphthalene resins, binaphthyl epoxy resins, naphthalene aralkyl epoxy resins, anthracene epoxy resins, phenoxy epoxy resins, dicyclopentadiene epoxy resins, norbornene epoxy resins, adamantane epoxy resins, and fluorene epoxy resins. Examples of the melamine resin include a polymer formed by polycondensation of melamine (2,4,6-triamino-1,3,5-triazine) and formaldehyde.

Examples of the phenolic resin include novolac phenolic resins such as phenol novolac resins, cresol novolac resins, and bisphenol A novolac resins, resol phenol resins such as methylol resole resins and dimethylene ether resole resins, or aryl alkylene phenol resins, and include one of these or combinations of two or more.

Examples of the urea resin include a resin obtained by condensation of urea and formaldehyde.

The above thermoplastic resin or the above thermosetting resin may be used singly or in combinations of two or more.

Examples of the above other additives can include reinforcing fiber other than glass fiber such as carbon fiber and metal fiber, a filler other than glass fiber such as glass powder, talc, and mica, a flame retardant, an UV absorber, a heat stabilizer, an antioxidant, an antistatic agent, a fluidity improver, an anti-blocking agent, a lubricant, a nucleating agent, an antibacterial agent, and pigment.

The glass fiber-reinforced resin composition of the present embodiment may be prepreg obtained by impregnating the glass fiber woven fabric of the present embodiment with the resin by a known method per se and semi-curing the woven fabric.

The glass fiber-reinforced resin composition of the present embodiment can be molded by a known molding method to obtain various glass fiber-reinforced resin molded articles. Examples of the known molding method include injection molding method, injection compression molding method, two-color molding method, hollow molding method, foam molding method including supercritical fluid, insert molding method, in-mold coating molding method, autoclave molding method, extrusion molding method, sheet molding method, thermal molding method, rotational molding method, laminate molding method, press molding method, blow molding method, stamping molding method, infusion method, hand lay-up method, spray-up method, low-pressure RIM molding method, resin transfer molding method, sheet molding compound method, bulk molding compound method, pultrusion method, and filament winding method. Curing the prepreg can also provide glass fiber-reinforced resin molded products.

Examples of applications of the molded article include electronic components such as printed wiring boards and connectors, housings of electronic devices, vehicle interior members, vehicle exterior members, housings of electronic devices such antennas and radars, and separators of fuel cells.

Examples and Comparative Examples of the present invention will be shown.

EXAMPLES

Examples 1 to 4, Comparative Examples 1 to 4, Reference Example

At first, glass raw material was mixed to obtain a glass batch so that the glass composition after melt-solidification is the composition of Examples 1 to 4, Comparative Examples 1 to 4, and Reference Example shown in Table 2.

Next, the obtained glass batch was placed in a platinum crucible. While this platinum crucible was held in an electric furnace for 4 hours under temperature conditions in the range of 1350 to 1550° C. appropriate for melting of the glass batch of each of Examples, Comparative Examples, and Reference Example, the glass batch was melted with stirring to obtain a homogeneous molten glass. Next, the obtained molten glass is poured onto a carbon plate and cooled to obtain bulk glass cullet.

Next, the obtained glass cullet was used to evaluate the biosolubility, the long fiber forming ability, and the strength at water absorption by methods shown below. The results are shown in Table 2.

The total elution rate of Si, B, Al, and Ca of the glass fiber obtained from the glass composition for glass fiber of Example 1 was 106 μg/h, the working temperature range was 159° C., and the coefficient of linear expansion was 5.5 ppm/K.

[Biosolubility]

First, the glass cullet described above was charged into a platinum container equipped with a nozzle tip at the bottom, and the platinum container was heated to a temperature in the range of 1150 to 1350° C. to melt the glass cullet to thereby obtain molten glass. Then, the molten glass drawn out through the nozzle tip and wound to a winding apparatus. Then, the heating temperature of the platinum container and the winding speed of the winding apparatus were adjusted, and the glass fiber was wound to the winding apparatus at a heating temperature in the range of 1150 to 1350° C. appropriate for the glass composition of each of Examples, Comparative Examples, and Reference Example, and at a winding speed in the range of 600 to 1200 rpm appropriate for the glass composition of each of Examples, Comparative Examples, and Reference Example to obtain a glass fiber sample having a filament diameter of 13.0 μm.

Next, in accordance with K. Sebastian. et al., Glass Science and Technology, Vol. 75, pp. 263-270 (2002), an elution test was performed on the glass fiber sample described above. Specifically, an artificial lung fluid of pH 4.5, which comprises the composition shown in Table 1 and simulates the environment in the lungs, was prepared by first sequentially adding No. 1 to 12 reagents shown in Table 1 to about 800 mL of distilled water kept at 37° C. such that the final volume of 1 L was achieved while the pH was adjusted with No. 13 hydrochloric acid so as to reach a pH of 4.5. Then, the prepared artificial lung fluid was allowed to stand for 24 hours. Then, in the artificial lung fluid after the standing, the pH had increased in association with release of carbonic gas, and thus the pH of the artificial lung fluid kept at 37° C. was adjusted to 4.5 again using hydrochloric acid.

Fiber taken in the lungs is known to be taken up by macrophages. As the pH around macrophages is 4.5, fiber having high solubility in the artificial lung fluid of pH 4.5 is expected to be dissolved inside the lungs.

TABLE 1

| No. | Compositional component of artificial lung fluid | Content (g/L) |
| --- | --- | --- |
| 1 | Sodium chloride | 7.12 |
| 2 | Sodium hydrogen carbonate | 1.95 |
| 3 | Calcium chloride | 0.022 |
| 4 | Disodium hydrogen phosphate | 0.148 |
| 5 | Sodium sulfate | 0.079 |
| 6 | Magnesium chloride hexahydrate | 0.212 |
| 7 | Glycine | 0.118 |
| 8 | Trisodium citrate dihydrate | 0.152 |
| 9 | Sodium tartrate dihydrate | 0.18 |
| 10 | Sodium pyruvate | 0.172 |
| 11 | 90% Lactic acid | 0.156 |
| 12 | Formaldehyde | 3 mL |
| 13 | Hydrochloric acid (1:1) | 4-5 mL |

Next, the glass fiber sample was cut to a length of 1 to 3 mm, which length can fit to an in-line filter holder, and used as a glass fiber sample for elution test. An elution test was performed in such a manner that the above glass fiber sample for elution test was mounted on a membrane filter with a pore diameter of 0.2 μm installed in an in-line filter holder, the above artificial lung fluid warmed to 37° C. was pumped into the in-line filter holder at a flow rate of 140 to 170 mL/day, and the filtrate that passed through the test glass powder sample and the filter holder was stored in a container. At this time, the mass of the sample mounted on the membrane filter was adjusted such that the ratio of the flow rate of the artificial lung fluid (unit: μm$^3$/s) to the sample surface area (unit: μm$^2$) (flow rate of the artificial lung fluid/sample surface area) was 0.030±0.005 μm/s.

After the elapse of 24 hours, the filtrate was recovered from the container, Si, Al, B, and Ca were taken as ions to be analyzed, and ion components eluted in the filtrate were quantified using inductively coupled plasma mass spectrometry (ICP-AES). The ICP-AES quantitative results of Si, Al, B, and Ca (μg) were each converted in terms of oxide and divided by 24 hours to calculate the elution rate (μg/h) of each component. The biosolubility was evaluated as "OK" when the total elution rate (μg/h) of each component was 100 μg/h or more, and the biosolubility was evaluated as "NG" when the total elution rate (μg/h) of each component was less than 100 μg/h. The results are shown in Table 2.

[Long Fiber Forming Ability]

By use of a high temperature electric furnace equipped with a rotational viscometer (manufactured by MOTOYAMA CO., LTD.), the glass cullet described above was melted in a platinum crucible, and the viscosity of the molten glass was continuously measured using the rotational viscometer with the melt temperature varied. The temperature at which the rotational viscosity was 1000 poise was measured to determine the 1000 poise temperature.

Next, 40 g of the glass particles having a particle diameter of 0.5 to 1.5 mm, obtained by pulverizing the glass cullet described above, were placed in a platinum boat of 180× 20×15 mm and heated in a tubular electric furnace provided with a temperature gradient of 900 to 1300° C. for 8 hours or more, then taken out of the tubular electric furnace, and observed with a polarized light microscope to identify the position at which crystals derived from devitrified glass began to precipitate. The temperature inside the tubular electric furnace was measured using a type B thermocouple to determine the temperature of the position at which the precipitation began, which temperature was taken as the liquid phase temperature.

Next, the working temperature range ΔT (ΔT=1000 poise temperature-liquid phase temperature) was calculated from the 1000 poise temperature and the liquid phase temperature measured by the above methods. The long fiber forming ability was evaluated as "A" when ΔT was 100° C. or more, the long fiber forming ability was evaluated as "B" when ΔT was 0° C. or more and less than 100° C., and the long fiber forming ability was evaluated as "C" when ΔT was less than 0° C. The results are shown in Table 2.

[Strength at Water Absorption]

The glass cullet obtained as described above was charged into a platinum container equipped with a nozzle tip at the bottom, and the platinum container was heated to a temperature in the range of 1150 to 1350° C. to melt the glass cullet to thereby obtain molten glass. Then, the molten glass was drawn out through the nozzle tip and wound to a winding apparatus. Then, the heating temperature of the platinum container and the winding speed of the winding apparatus were adjusted, and the glass fiber was wound to the winding apparatus at a heating temperature in the range of 1150 to 1350° C. appropriate for the glass composition of each of Examples, Comparative Examples, and Reference Example, and at a winding speed in the range of 600 to 1200 rpm appropriate for the glass composition of each of Examples, Comparative Examples, and Reference Example to obtain a glass fiber having a filament diameter of 13.0 μm.

Next, a single fiber (monofilament) was collected between the nozzle tip and the winding apparatus, and one that was in a state of no deterioration due to contact or friction was used as a sample.

Next, the monofilament described above was adhered to predetermined backing paper having a hole of 25 mm in diameter in the center. It was then immersed completely in distilled water at 25° C. After immersion for 3 hours, the backing paper was taken out of the distilled water and allowed to stand in a dryer set to 50° C. for 1 hour for drying to make a test piece. The test piece was set in the gripper of a tensile tester (manufactured by ORIENTEC CO., LTD.), the edge of the backing paper was cut off, and a tensile test was conducted at a crosshead speed of 5 mm/min. The strength at water absorption was calculated from the maximum load value at break and the fiber cross-sectional area. The fiber cross-sectional area was calculated from the fiber diameter obtained by observing the monofilament with a scanning electron microscope (manufactured by JEOL Ltd., trade name: JSM-IT800). Test pieces in which yarn cast-off occurred during the measurement were excluded, and the average value of n=12 was used as the measured value of strength at water absorption. The results are shown in Table 2.

[Coefficient of Linear Expansion]

In order to remove strain from the glass cullet described above, it was heated at an annealing temperature (550 to 750° C.) for 2 hours and cooled to room temperature over 8 hours to obtain a test piece. Next, the test piece was processed into a test piece for coefficient of linear expansion measurement of 4 mm×4 mm×20 mm using a cutting machine such as diamond cutter and a polisher. Next, the obtained test piece for coefficient of linear expansion measurement was heated at a temperature increase rate of 10° C./min, and the amount of elongation was measured using a coefficient of thermal expansion measuring apparatus (manufactured by NETZSCH, trade name: DIL 402) at a temperature in the range of 50 to 200° C. From the amount of elongation, the coefficient of linear expansion was calculated.

TABLE 2

|  | Example 1 | Example 2 | Example 3 | Example 4 | Comparative Example 1 | Comparative Example 2 | Comparative Example 3 | Comparative Example 4 | Reference Example |
|---|---|---|---|---|---|---|---|---|---|
| $SiO_2$ (mass %) | 43.24 | 40.98 | 36.30 | 43.67 | 39.50 | 38.02 | 41.05 | 45.15 | 51.80 |
| $Al_2O_3$ (mass %) | 20.03 | 21.21 | 21.13 | 18.96 | 24.10 | 19.16 | 26.17 | 21.03 | 14.10 |
| $B_2O_3$ (mass %) | 13.02 | 13.56 | 18.66 | 17.49 | 18.40 | 18.00 | 17.53 | 19.53 | 6.40 |
| MgO (mass %) | 9.13 | 6.41 | 15.51 | 11.94 | 0.00 | 4.43 | 10.17 | 5.60 | 0.70 |
| CaO (mass %) | 14.58 | 17.84 | 8.39 | 7.94 | 18.00 | 20.39 | 5.08 | 8.69 | 25.00 |
| Others (mass %) |  |  |  |  |  |  |  |  | 2.00 |
| Total (mass %) | 100.00 | 100.00 | 100.00 | 100.00 | 100.00 | 100.00 | 100.00 | 100.00 | 100.00 |
| CaO + MgO (mass %) | 23.71 | 24.25 | 23.90 | 19.88 | 18.00 | 24.82 | 15.25 | 14.29 | 25.70 |
| MgO/CaO | 0.63 | 0.36 | 1.85 | 1.50 | 0.00 | 0.22 | 2.00 | 0.64 | 0.03 |
| MgO/$Al_2O_3$ | 0.46 | 0.30 | 0.73 | 0.63 | 0.00 | 0.23 | 0.39 | 0.27 | 0.05 |
| Strength at water absorption (GPa) | 2.3 | 2.2 | 2.3 | 2.3 | 1.8 | 1.8 | 1.3 | 1.7 | 2.1 |
| Long fiber forming ability | A | B | B | A | A | B | C | A | A |
| Biosolubility | OK | OK | OK | OK | OK | OK | OK | OK | NG |

From Table 2, it is clear that the glass compositions for glass fiber of Examples 1 to 4 comprise biosolubility, can achieve long fiber formation, and can provide a glass filament comprising sufficiently high strength at water absorption.

In contrast, it is clear that the glass filaments obtained from the glass compositions for glass fiber of Comparative Examples 1 and 2, in which the ratio of the content of MgO to the content of CaO (MgO/CaO) is less than 0.29, comprise biosolubility, but cannot obtain sufficiently high strength at water absorption. It is also clear that the glass filament obtained from the glass composition for glass fiber of Comparative Example 3, in which the ratio of the content of MgO to the content of CaO (MgO/CaO) exceeds 1.92 and the total content of MgO and CaO is less than 17.09% by mass, comprises biosolubility, but cannot obtain sufficiently high strength at water absorption, and also has low long fiber formation ability. In addition, it is clear that the glass filament obtained from the glass composition for glass fiber of Comparative Example 4, in which the ratio of the content of MgO to the content of CaO (MgO/CaO) is in the range of the present invention but the total content of MgO and CaO is less than 17.09% by mass, comprises biosolubility, but cannot obtain sufficiently high strength at water absorption.

Further, it is clear that the glass filament obtained from the glass composition for glass fiber of Reference Example, in which the content of $SiO_2$ exceeds 50.00% by mass and the content of MgO is less than 2.00% by mass, with respect to the total amount, does not comprise biosolubility. The glass composition of the glass composition for glass fiber of Reference Example is the E glass composition, which is considered the most generic glass composition for glass fiber.

The invention claimed is:

1. A glass composition for glass fiber, comprising:
   $SiO_2$ in a range of 35.00 to 50.00% by mass;
   $Al_2O_3$ in a range of 12.00 to 28.00% by mass;
   $B_2O_3$ in a range of 10.00 to 25.00% by mass;
   MgO in a range of 2.00 to 18.00% by mass; and
   CaO in a range of 5.00 to 25.00% by mass,
   with respect to a total amount, wherein
   a total content of MgO and CaO is in a range of 17.09 to 30.00% by mass, and
   a ratio of a content of MgO to a content of CaO (MgO/CaO) is in a range of 0.29 to 1.92,
   the content S of $SiO_2$, the content A of $Al_2O_3$, the content B of $B_2O_3$, the content M of MgO, and the content C of CaO, satisfy the following formula (1), $$21.8 \leq S \times (C+M)/(A+B) \leq 34.0 \quad (1).$$

2. The glass composition for glass fiber according to claim 1, wherein the ratio of a content of MgO to a content of CaO (MgO/CaO) is in a range of 0.49 to 1.68.

3. Glass fiber comprising glass filaments formed of the glass composition for glass fiber according to claim 1.

4. The glass fiber according to claim 3, wherein a filament diameter of each of the glass filaments is less than 3.0 µm.

5. A glass fiber woven fabric comprising the glass fiber according to claim 3.

6. A glass fiber-reinforced resin composition comprising the glass fiber according to claim 3.

7. A glass fiber woven fabric comprising the glass fiber according to claim 4.

8. A glass fiber-reinforced resin composition comprising the glass fiber according to claim 4.

\* \* \* \* \*